June 20, 1933.  L. E. LA BRIE  1,914,997
MANUFACTURE OF BRAKE SHOES
Filed Oct. 6, 1928  2 Sheets-Sheet 1

INVENTOR.
LUDGER E. LA BRIE
BY
ATTORNEYS.

June 20, 1933.  L. E. LA BRIE  1,914,997

MANUFACTURE OF BRAKE SHOES

Filed Oct. 6, 1928  2 Sheets-Sheet 2

INVENTOR.
LUDGER E. LA BRIE
BY
ATTORNEYS.

Patented June 20, 1933

1,914,997

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

MANUFACTURE OF BRAKE SHOES

Application filed October 6, 1928. Serial No. 310,833.

This invention relates to brakes, and is described in connection with the manufacture from sheet steel of the shoes of an internal expanding automobile brake. An object of the invention is to provide an inexpensive method of making a light but very strong type of brake shoe, preferably by drawing sheet metal through a die to fold it on itself to provide the rims of the shoes and suitable stiffening webs therefor.

The above and other objects and features of the invention, including various novel and desirable details, will be apparent from the following description of the illustrative method and article shown in the accompanying drawings, in which.

Figure 1:
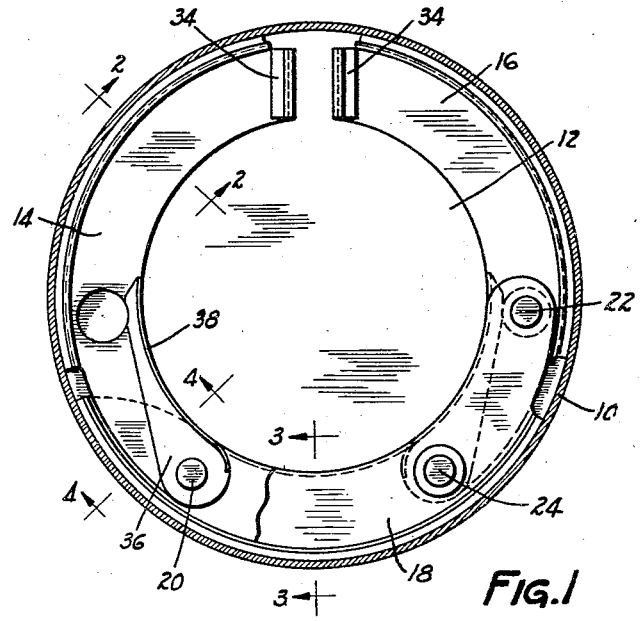
Figure 1 is a vertical section through a brake, just inside the head of the brake drum, and showing my novel brake shoes in side elevation.
Figure 2:
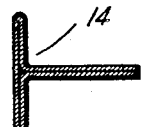
Figure 2 is a section through the primary shoe of the brake, on the line 2—2 of Figure 1.
Figure 3:
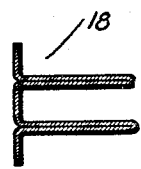
Figure 3 is a section through the secondary shoe of the brake, on the line 3—3 of Figure 1.
Figure 4:
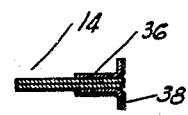
Figure 4 is a section through the primary shoe adjacent its pivoted end, on the line 4—4 of Figure 1.
Figure 5:
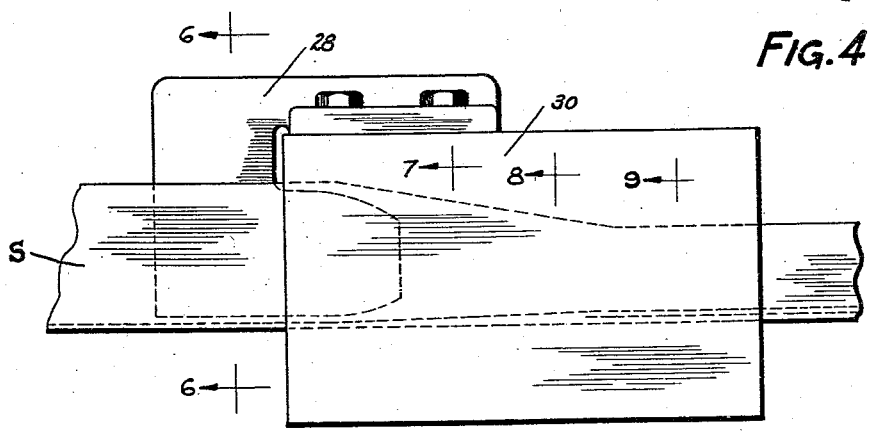
Figure 5 is a side elevation of a die with the sheet metal being drawn therethrough.
Figure 10:
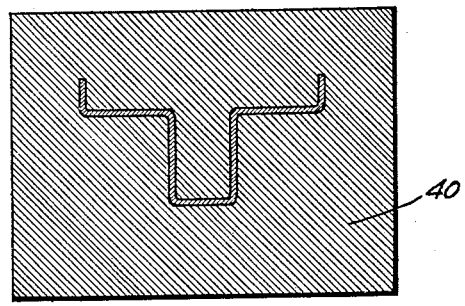
Figure 11:
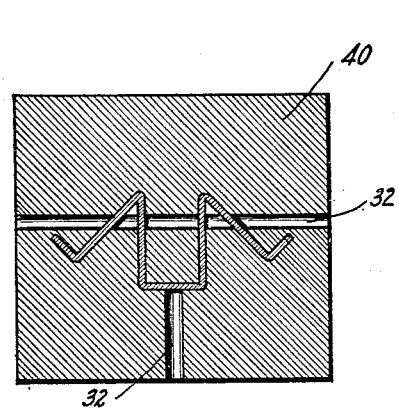
Figure 12:
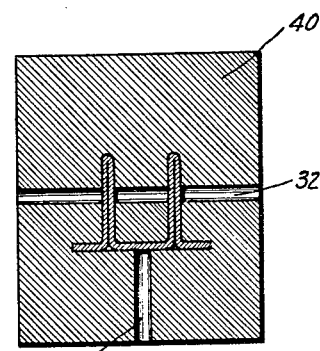

Figures 6, 7, 8, and 9 are respectively sections on the lines 6—6, 7—7, 8—8, and 9—9, of Figure 5, showing various stages of the drawing operation; and Figures 10, 11, and 12 are similar sections showing successive stages of the drawing of a secondary shoe.

The illustrated brake includes a rotatable drum 10, at the open side of which is a support such as a backing plate 12, and within which is the friction means of the brake. In this particular brake the friction means includes primary and auxiliary shoes 14 and 16, T-shaped in cross-section, and an intermediate secondary shoe 18 having two spaced stiffening webs straddling the lower ends of shoes 14 and 16.

Shoe 14 is connected to the secondary shoe 18 by a floating pivot 20, while the secondary shoe in turn is anchored on a fixed pivot 22 passing through a relatively large opening in the web of shoe 16. Shoe 16 is anchored on a fixed pivot 24 passing through relatively large openings in the webs of the shoe 18. The applying means and the return springs, being of well-known construction, are not herein shown. The shoes are faced with the usual friction lining riveted or otherwise secured thereto, the faces of the shoes preferably being knurled or serrated or otherwise roughened to hold the lining against creeping.

According to an important feature of the present invention, the shoes are formed in a novel manner by folding sheet steel by drawing it through a forming die. In Figures 5–9 I illustrate the formation of one of the shoes 14 or 16.

Figure 6:
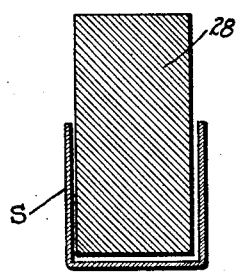
Figure 7:
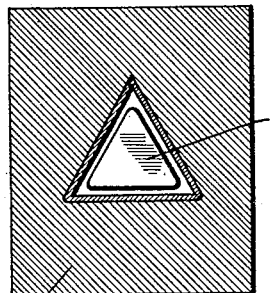
Figure 8:
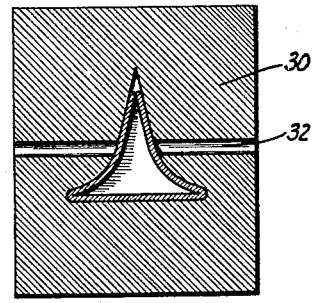
Figure 9:
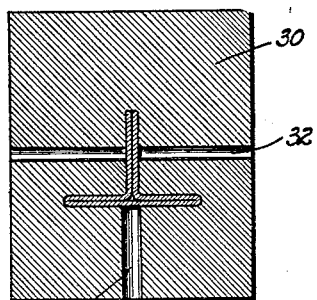

In this process, the sheet metal "S" is first drawn over a mandrel 28 which gradually changes from a rectangular cross-sectional form as shown in Figures 6 to a triangular section as shown in Figure 7, the sheet steel being drawn through a die 30 of corresponding shape. Die 30 is made up of suitable sections secured together in any desired manner, and may be provided with passages 32 for the circulation of a lubricating fluid.

It will be seen that the metal is first drawn to a channel form, and the walls of the channel are then folded in upon the base of the channel (Figure 9), thus giving a double-thickness rim and a double-thickness stiffening web.

Lengths are next severed from the formed material and bent into arcs in any desired manner. The excess material of the rim is cut away at the lower end of the shoe, a cam plate 34 is secured at the upper end, reinforcing plates 36 are welded to opposite sides of the web at the pivoted end of the shoe, and the openings for pivot 20 or anchor 24 and for anchor 22 are punched or drilled in the web. The plates 36 preferably have laterally-projecting stiffening flanges 38 extending along the inner edge of the shoe web.

Shoe 18 is formed as shown in Figures 10–12, by drawing the material through a die 40 to form a generally channel-shaped structure having side wings in effect forming two parallel pairs of adjoining portions, the wings being bent down against the sides of the channel to form two double-thickness stiffening webs. As before, lengths are cut and bent on arcs, the excess rim material is cut away, and holes for anchors 22 and 24 and for pivot 20 are punched or drilled.

It is not my intention to limit the scope of my invention to the manufacture of the particular shoes described, or otherwise than by the terms of the appended claims.

I claim:

1. That method of making a brake-shoe segment which comprises drawing sheet metal through a die to form it first into a channel having walls and a base, and then further drawing it to fold the walls of the channel underneath the base to form a double-thickness rim portion and a double-thickness web between the edges of the rim portion.

2. That method of making a brake-shoe segment which comprises drawing sheet metal through a die to form it first into a channel having walls and a base, and then further drawing it to fold the walls of the channel underneath the base to form a rim portion and a web.

3. That method of making a brake-shoe segment which comprises drawing sheet metal through a die to fold the metal to provide a base and a plurality of angularly related portions, and pressing the sides of said portions together by drawing through a second die to form a double-thickness stiffening web rigidly secured to said base.

4. That method of making a brake-shoe segment which comprises drawing sheet metal through a die to fold the metal to provide a base and two parallel pairs of adjoining portions, pressing the sides of said portions together by drawing through a second die and subsequently bending the drawn metal into an arc to form two double-thickness stiffening webs rigidly secured to said base.

5. That method of making a brake-shoe segment from sheet metal of less thickness than the thickness of a component part of the completed segment, which comprises drawing the sheet metal through a die to form a channel having sides and a base, bending the sides of the channel intermediate their edges, pressing certain of the bent portions into intimate contact to form a double-thickness web, and bending the structure so formed on an arc.

6. That method of forming a brake-shoe segment from sheet metal of less thickness than the thickness of a component part of the completed segment, which comprises drawing the sheet metal through a die to form a channel having sides and a flat base, bending the sides intermediate their edges, pressing certain side portions into intimate contact to form a double-thickness web, pressing the remaining portions parallel with the channel base, and bending the structure so formed on an arc.

7. That method of making a brake-shoe segment which comprises drawing sheet metal through a die to fold the metal to provide a base and a pair of sides symmetrical with respect to each other, folding the sides along the central portion thereof, and pressing a portion of the sides together to form a double-thickness stiffening web, and bending the structure so formed on an arc.

In testimony whereof, I have hereunto signed my name.

LUDGER E. LA BRIE.